United States Patent
Mercier

[11] 3,904,337
[45] Sept. 9, 1975

[54] APPARATUS FOR MOLDING BLADDERS

[76] Inventor: Jacques H. Mercier, 49 rue de Naples, Paris, France

[22] Filed: July 21, 1971

[21] Appl. No.: 164,708

[52] U.S. Cl. .............. 425/128; 425/414; 425/412; 425/DIG. 47
[51] Int. Cl.² .... B29D 3/02; B29H 7/00; B29C 3/00
[58] Field of Search .......... 425/112, 117, 126, 127, 425/128, 356, 410, 412, 423, DIG. 47, 415, 234, 419, 405; 249/205

[56] References Cited
UNITED STATES PATENTS

| | | | |
|---|---|---|---|
| 137,873 | 4/1873 | Albright | 425/DIG. 47 |
| 2,419,089 | 4/1947 | Quarnstrom | 249/205 |
| 2,473,284 | 6/1949 | Knaggs | 425/DIG. 47 |
| 2,829,401 | 4/1958 | Mercier | 425/356 X |
| 2,874,409 | 2/1959 | Quarnstrom | 249/205 |
| 2,877,497 | 3/1959 | Mercier | 425/410 |
| 3,063,097 | 11/1962 | Jutzi | 425/DIG. 47 |
| 3,090,996 | 5/1963 | Reichenbach et al. | 425/DIG. 47 |
| 3,237,248 | 3/1966 | Mercier | 425/414 |
| 3,241,193 | 3/1966 | Pohlman | 425/DIG. 47 |
| 3,246,359 | 4/1966 | Rhoads et al. | 425/128 |
| 3,315,316 | 4/1967 | Baney et al. | 425/DIG. 47 |
| 3,490,099 | 1/1970 | Smith et al. | 425/DIG. 47 |
| 3,613,223 | 10/1971 | Bush | 425/DIG. 47 |

*Primary Examiner*—J. Howard Flint, Jr.
*Attorney, Agent, or Firm*—Arthur B. Colvin

[57] ABSTRACT

A mold for forming bladders, said mold including a base member having an elongated recess therein and a cover having a core member associated therewith and adapted to be moved into the recess, the core member and the recess defining an annular cavity therebetween when juxtaposed which conforms to the shape of the bladder to be formed, the recess having a mouth exposed in the top surface of the base member, said recess having an enlarged diameter portion between the mouth thereof and the lower end of the recess defining an annular shoulder, the inner periphery of which forms an upstanding annular cutting edge. The core member comprises a body portion having an enlarged diameter portion at its upper end defining a second annular shoulder, the outer periphery of which defines an annular clamp member, which when said core member is moved into the recess, will be vertically aligned with said annular cutting edge, the portion of the annular cavity between the core member adjacent the second annular shoulder and the wall of the recess adjacent the annular cutting edge, being of enlarged width for formation of the thickened rim of the bladder, said mold having an annular cavity rising from the outer periphery of the first annular shoulder parallel to the axis of the recess to receive excess molding material.

6 Claims, 4 Drawing Figures

APPARATUS FOR MOLDING BLADDERS

As conducive to an understanding of the invention, it is noted that in the formation of bladders in a mold there normally is excess bladder material or "flash" which extends laterally outward beyond the outer wall of the molded bladder which must be removed in order to finish the bladder.

Where the removal of such flash requires a separate grinding action, this additional manufacturing step is timeconsuming and costly.

It is accordingly among the objects of the invention to provide a mold for forming bladders which is relatively simple in construction and may readily be fabricated at relatively low cost, having but few parts and which may readily be operated to form a bladder of desired configuration with assurance that excess bladder material may readily be removed without need for a separate grinding operation hence reducing the cost of the finished bladder.

According to the invention, these objects are accomplished by the arrangement and combination of elements hereinafter described and more particularly recited in the claims.

In the accompanying drawings in which is shown one of various possible embodiments of the several features of the invention;

Figure 1:
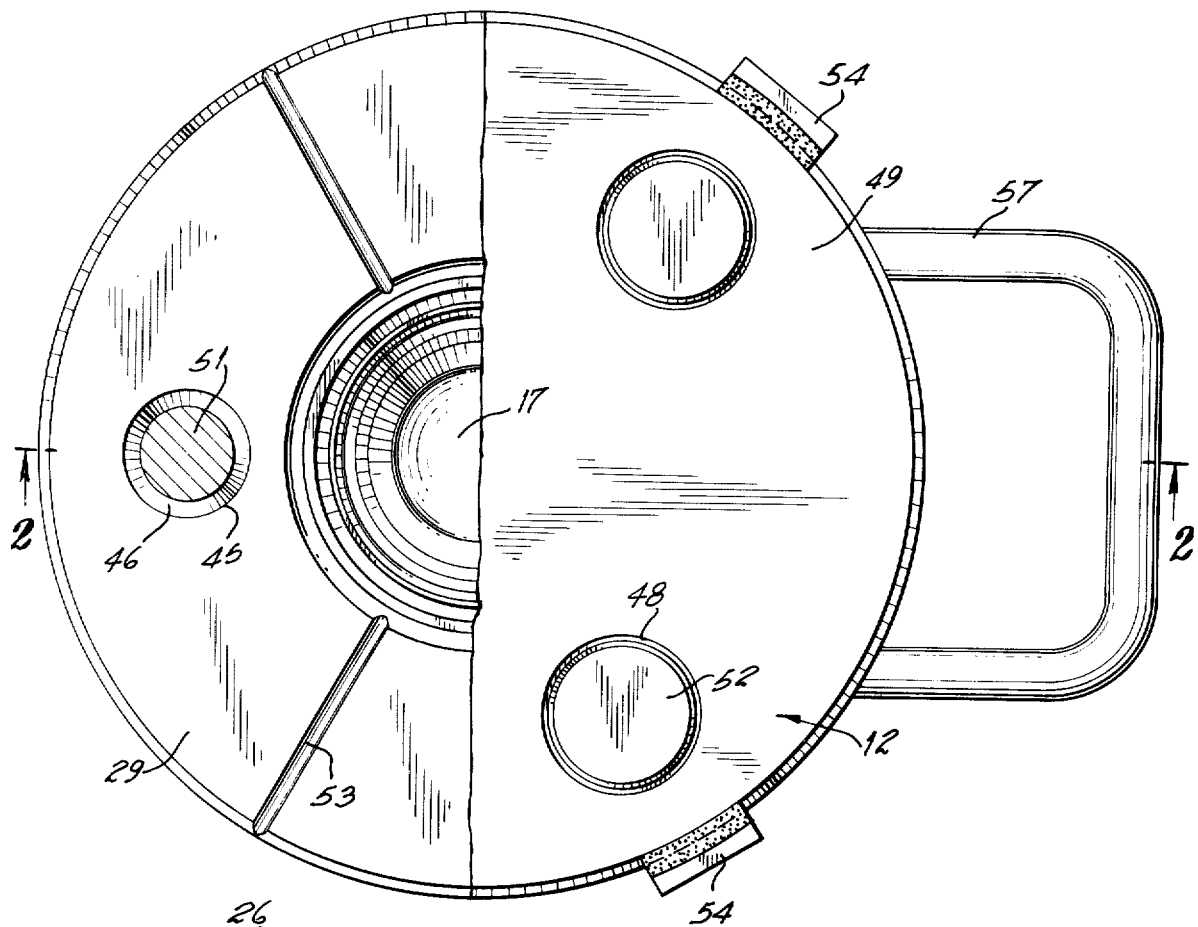
FIG. 1 is a top plan view of the mold with parts broken away.

Referring now to the drawings, the mold comprises a base member 11 and a cover 12 having a core member 13 depending therefrom.

The base member 11 has an elongated recess 14 therein of shape corresponding to the outer configuration of the bladder 15 to be formed. More particularly, the side wall surface 16 of the recess 14 tapers inwardly toward the bottom 17 thereof which is curved as shown. The region 18 of the recess 14 at which the mouth 19 of the bladder 15 will be formed, tapers outwardly as shown at 21 and then has a cylindrical portion 22 terminating in a relatively sharp annular cutting edge 23.

Figures 2, 3:
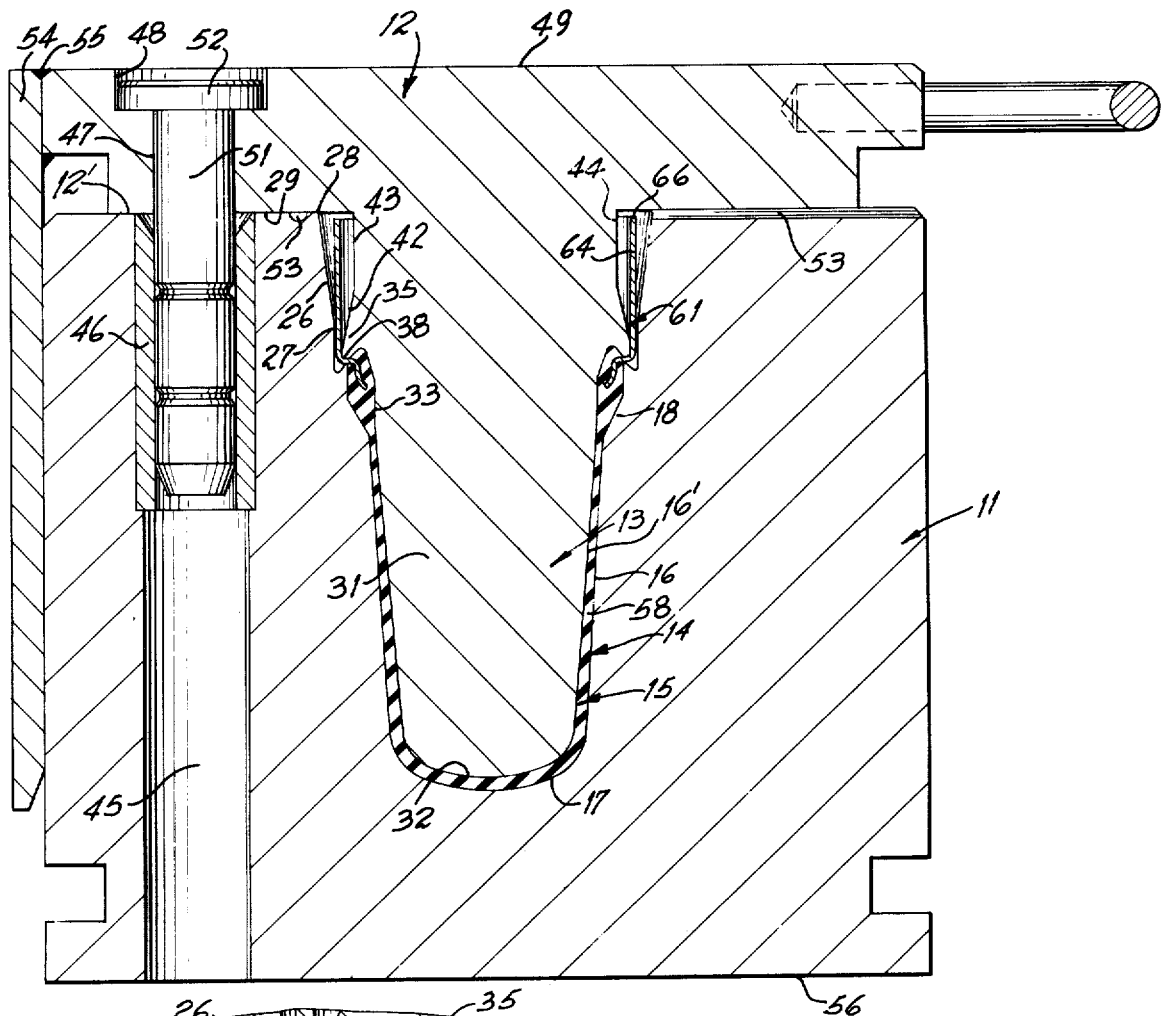
FIG. 2 is a sectional view taken along line 2-2 of FIG. 1.
FIG. 3 is a detailed view on an enlarged scale showing the mold in partially closed position.

The recess 14 then has an annular groove 24 positioned laterally outward of said annular cutting edge 23 and below the horizontal plane of the latter as is shown in FIG. 3 for example.

Thereupon, the side wall of the recess 14 rises from the outer portion of the annular groove 24 to form a second substantially cylindrical portion 25, which is of enlarged diameter, forming an annular shoulder in which the annular groove 24 is formed. The side wall of the recess 14 then tapers outwardly as at 26 from the upper edge 27 of the second cylindrical portion 25 to the mouth 28 of the recess 14 which is exposed in the top surface 29 of the base 11.

The cover 12 is in the form of a heavy rigid plate and the core member 13 which depends from the plate 12 is of dimension and length such that when positioned in the recess 14 axially aligned therewith and with the cover 12 seated on the top surface 29 of the base 11, the outer surface of the core 13 will be properly spaced from the wall surface of the recess 14 to define a cavity therebetween of dimension and configuration corresponding to the desired shape of the bladder to be formed.

More particularly, the core member 13 has a tapered body portion 31 with a rounded bottom end 32. As shown in FIG. 2, the taper of the body portion 31 is illustratively greater than that of the corresponding side wall portion 16 of the recess 14 so that the wall thickness of the bladder 15 to be formed will gradually increase from the upper edge or mouth 19 thereof to its rounded lower end 17.

Figure 4:
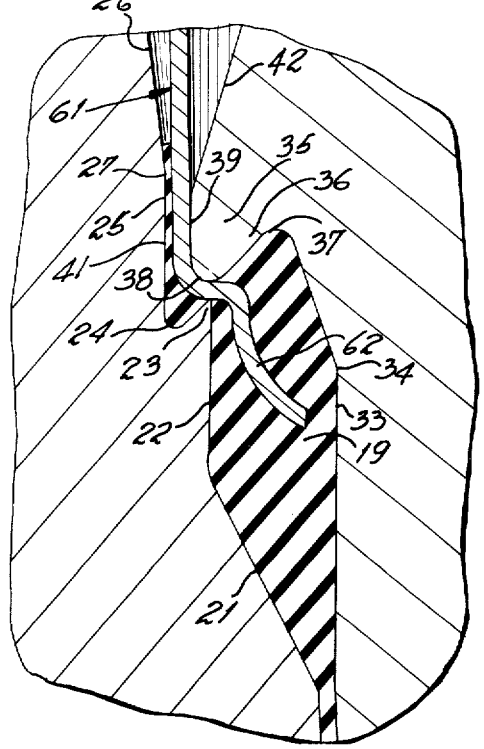
FIG. 4 is a view similar to FIG. 3 showing the mold in closed position.

The core member 13 has a substantially cylindrical portion 33 which is located so as to be aligned with the tapered portion 21 and cylindrical portion 22 of the recess when the mold is in closed position as shown in FIGS. 2 and 4. The upper edge 34 of the cylindrical portion 33 of the core member illustratively lies in a horizontal plane which may be slightly below the horizontal plane of the annular cutting edge 23.

The core member then has an enlarged diameter portion 35 extending laterally outward from the body portion 31 of the core member and forming an annular shoulder 36, the undersurface of which has an annular groove 37 therein. The outer periphery 38 of the large diameter portion 35 is rounded as shown to define an annular clamp member, and is adapted to be vertically aligned with the annular cutting edge 23. The outer surface 39 of the enlarged diameter portion 35 rising from the rounded periphery 38 is substantially cylindrical as shown and of diameter substantially less than that of the cylindrical portion 25 of the recess to define an annular clearance 41 therebetween. The core member then has an inwardly tapered portion 42 extending upwardly from the cylindrical portion 39 thereof and then has a cylindrical portion 43 extending to the root end 44 of the core member.

Means are provided to retain the core member 13 axially aligned with the recess 14 when the mold is moved to the closed position shown in FIG. 2.

To this end, as is shown in FIGS. 1 and 2, the base 11 has a plurality of vertical bores 45 extending therethrough which extend parallel to the vertical axis of the recess 14 and core member 13. The upper end of each of the bores 45 has a bushing 46 secured therein as by force fit. The cover member 12 has a corresponding plurality of bores 47 extending therethrough adapted to be axially aligned with the bores 45 and bushings 46, each of the bores 47 having an enlarged diameter mouth 48 exposed in the top surface 49 of the cover 12.

A plurality of guide pins 51 are provided designed to extend with minimum clearance through the bores 47 into the bushings 46. The clearance between the pins 51 and the bores 47 and the bores of the bushings 46 is at a minimum so that lateral displacement of the cover member 12 and the core member 13 carried thereby with respect to the recess 14 will be precluded to insure that the core member 13 is axially aligned with the recess in order that the wall thickness of the bladder 15 will be circumferentially uniform.

Each of the pins 51 has a head 52 designed to be moved into the enlarged diameter portion 48. The top surface 29 of the base member 11 has a plurality of radiating grooves 53 extending from the mouth 28 of the recess 14 to the exterior to permit venting of gases that develop during the molding operation.

In order to initially guide the cover member with respect to the base member 11, a plurality of depending arms 54 are provided which, as shown in FIGS. 1 and 2, are welded at their upper end as at 55 to the outer periphery of the cover member 12 and extend downwardly toward the bottom 56 of the base member 11. The cover member has a pair of diametrically opposed lifting handles 57 extending laterally outward therefrom.

The mold above described is particularly suitable for forming a deformable partition of the type shown in U.S. Pat. No. 3,500,866. More particularly, this partition is in the form of an enlongated bladder 15 of rubber or similar material having like characteristics. The bladder 15 is closed at one end as at 17 and is substantially frusto-conical in cross section with the side wall 58 thereof being of greater diameter at the mouth 19 of the bladder than at the closed end 17 thereof.

As is clearly shown in FIG. 3, for example, the mouth 19 of the bladder has a thickened rim to which an annular supporting member 61 is affixed by being molded therein as shown. The supporting member 61 is of relatively thin resilient sheet metal such as sheet steel and has a curved lower or mounting portion 62 convex on its lower surface as at 63 and an upper or retaining portion 64. The portion 62 is preferably coated on both sides with an uncured bonding agent prior to insertion into the mold. The lower portion 62 is molded integrally into the thickened rim 19 with the upper portion 64 being transversely spaced outwardly as at 65 from the lower portion 62 and extending upwardly beyond the thickened rim 19.

To form a bladder of the type described in the mold shown in the drawings, an annular supporting member is positioned in the opened mold so that the undersurface of the annular portion 65 of the supporting member is seated on the annular cutting edge 23 as is clearly shown in FIG. 3, the bonding agent extending to said cutting edge 23.

The outer diameter of the upper portion 64 of the annular supporting member and the inner diameter of the cylindrical portion 25 of the recess 14 are such that the upper portion 64 will fit in cylindrical portion 25 with a minimum of clearance to prevent lateral displacement of the annular supporting member. The height of the upper portion 64 is such that when the annular portion 65 of the supporting member is seated on annular cutting edge 23, the upper edge 66 of upper portion 64 will be below the plane of the top surface 29 of the base member 11 as shown in FIG. 2. With the annular supporting member so positioned, the curved lower end 62 thereof will be located substantially in the center of the region in which the thickened rim 19 of the bladder will be formed.

Thereupon, a predetermined charge of the material from which the bladder is to be formed is placed in the bottom of recess 14. The core is then axially aligned with the recess 14 and lowered thereinto so that the bores 47 in the cover member will be aligned with the bores of the bushing 46 and the pins 51 are positioned in the bores 47 so as to extend into the associated bushings 46.

Thereupon, the cover member 12 and the core member 13 depending therefrom is forced downwardly as by means of a suitable hydraulic press until the undersurface 12' of the cover member 12 is seated on the top surface 29 of the base 11 and the cover is retained in this position during the molding operation.

As the result of such downward movement of the cover member 12 and the core member 13, the charge of material in the bottom of the recess 14 will rise in the clearance between the core and the wall of the recess to fill such space. Sufficient material is initially charged into the recess 14 so that the material will rise not only to form the side wall portion 16' of the bladder, but also to form the thickened rim or mouth portion 19 thereof and more particularly, the charge of material, as shown in FIGS. 3 and 4 will rise sufficiently to cover the lower portion 62 of the annular supporting member. As the core member 13 is moved downwardly and approaches its final position, i.e., when it moves from the position shown in FIG. 3 to the final position shown in FIG. 4, the rounded periphery 38 will move against the top surface of the annular portion 65, as is shown in FIG. 4, clamping the undersurface of such annular portion against the annular cutting edge 23. It is to be noted that the outer diameter of the cylindrical portion 39 of the core member, as shown in FIG. 3, is just slightly smaller than the inner diameter of the portion 64 of the supporting member so that the core member may readily move through such supporting member and the portion 64 will be dependably restrained against any substantial lateral displacement.

As the core member approaches its final position, as shown in FIG. 4, the charge of material in the bladder will tend to move laterally beyond the cutting edge 23 into the annular groove 24 as shown in FIGS. 3 and 4 and then will rise upwardly on the exterior of the portion 64, sufficient clearance being afforded as at 41 in FIG. 4 to permit such movement of the charge of material. If not for such clearance, final movement of the core member to its closed position, shown in FIG. 4, might be precluded.

When the core member has moved to its final position shown in FIG. 4, the charge of material will have completely filled the annular groove 34 and due to the force exerted by the rounded periphery 38 against the top surface of the annular portion 65, the bottom surface of such annular portion 65 will press tightly against the annular cutting edge 23 thereby severing the bladder material or flash that moved laterally past the annular cutting edge 23 into the annular groove 24.

After the molding operation has been completed, the cover member and associated core member are then moved away from the base 11 by lifting on the handles 57 and then the bladder with its associated supporting member may readily be stripped from the mold recess 14. Due to the fact that there is a dependable cutting of the flash or excess material that moves past the annular cutting edge 23, such recess material may readily be stripped away from the annular supporting member without need for grinding such material away. By reason of the fact that the excess material or flash is accommodated in a vertical direction rather than laterally, the mold may be dependably closed and furthermore by reason of the automatic self trimming operation, there is assurance that each bladder formed in the mold will be uniform.

Having thus described my invention, what I claim as new and desire to secure by Letters Patent of the United States is:

1. A mold for forming bladders of the type having an enlarged diameter mouth with an annular supporting member having a mounting portion at its lower edge to which the mouth of the bladder is secured, a portion extending transversely outwardly from the mounting portion and a retaining portion rising from the outer periphery of such transverse portion, said mold comprising a base member having an elongated recess therein and a cover having a core member associated therewith and adapted to be moved into said recess, said core member and said recess defining an annular cavity therebetween when juxtaposed, conforming to the shape of the bladder to be formed, said recess having a mouth exposed in the top surface of the base member, said recess having an enlarged diameter portion between the mouth thereof and the lower end of said recess defining an annular shoulder, the inner periphery of said annular shoulder forming an annular cutting edge against which the undersurface of the transverse portion of the annular supporting member is adapted to abut when the mold is closed, said core member comprising a body portion having an enlarged diameter portion at its upper end defining a second annular shoulder, the outer periphery of said second annular shoulder defining an annular clamp member, having a portion which when said core member is moved into the recess, will be vertically aligned with said annular cutting edge, and adapted to abut against the top surface of the transverse portion of the annular supporting member when the mold is closed, the portion of the annular cavity between the core member and the wall of the recess adjacent the annular cutting edge being of enlarged width for formation of the thickened rim of the bladder, whereby, when the said mold is closed, any bladder material extending over said annular cutting edge will be severed from the body of the bladder.

2. The combination set forth in claim 1 in which said first annular shoulder has an annular groove therein, the inner edge of said groove defining an annular cutting edge and the wall portion of said recess rising from the outer edge of said groove is cylindrical at the region thereof adjacent said annular groove.

3. The combination set forth in claim 1 in which the undersurface of said second annular shoulder has an annular groove therein, which when the mold is in closed position, with the annular clamp member in juxtaposition to the annular cutting edge, will define the top wall of the portion of the annular cavity in which the thickened rim of the bladder is formed.

4. The combination set forth in claim 1 in which means are provided axially to align the core member and said recess, whereby the annular cavity between said core member and the wall of said recess will be circumferentially uniform in width.

5. The combination set forth in claim 4 in which the base member has a plurality of bores therein extending parallel to the axis of said recess, and said cover has a corresponding plurality of bores therethrough adapted to be aligned with the bores in said base member and means are provided extending through the aligned bores in the cover and the base member to prevent relative lateral displacement of said core member and said base member thereby to align said core member and said recess.

6. The combination set forth in claim 2 in which the outer periphery of the enlarged diameter portion of said core member at least at the region thereof adjacent the annular clamp member is also cylindrical, whereby when the mold is in closed position with the annular clamp member in juxtaposition to the annular cutting edge and with said cylindrical portions in spaced parallel relation, the annular groove in said first annular shoulder and the clearance between said juxtaposed cylindrical portions of said recess and said core member will define an annular flash receiving cavity extending parallel to the axis of said core member and said recess.

* * * * *